United States Patent
Toyohara

(12)

(10) Patent No.: US 6,304,697 B1
(45) Date of Patent: Oct. 16, 2001

(54) THERMO-OPTIC DEVICE WITH EVANESCENT WAVE COUPLING

(75) Inventor: Atsushi Toyohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/315,965

(22) Filed: May 21, 1999

(30) Foreign Application Priority Data

May 29, 1998 (JP) .................................................. 10-164382

(51) Int. Cl.[7] ....................................................... G02B 6/26
(52) U.S. Cl. ................................ 385/50; 385/30; 385/40; 385/41; 385/42; 385/47
(58) Field of Search ................................. 385/30, 40, 49, 385/50, 47, 48, 41, 42

(56) References Cited

U.S. PATENT DOCUMENTS

| | | | |
|---|---|---|---|
| 5,361,157 | * 11/1994 | Ishikawa et al. | 359/168 |
| 5,566,263 | * 10/1996 | Smith et al. | 385/40 |
| 5,799,120 | * 8/1998 | Kurata et al. | 385/45 |
| 5,886,807 | * 3/1999 | Cummings | 359/263 |
| 5,949,931 | * 9/1999 | Kitamura | 385/28 |
| 5,966,493 | * 10/1999 | Wagoner et al. | 385/140 |

FOREIGN PATENT DOCUMENTS

| | | |
|---|---|---|
| 0 457 406 | 11/1991 | (EP) . |
| 60-192913 | 10/1985 | (JP) . |
| 63-234227 | 9/1988 | (JP) . |
| 2-166425 | 6/1990 | (JP) . |
| 03-256028 | 11/1991 | (JP) . |
| 3-256028 | 11/1991 | (JP) . |
| 5-2116 | 1/1993 | (JP) . |

OTHER PUBLICATIONS

St. Regis Paper Company v. Bemis Company, Inc. (CA 7), 193 USPQ 8, Feb. 3, 1977, Decided Feb. 3, 1977, No. 76–1044 U.S. Court of Appeals Seventh Circuit.*
M. Kawachi, "Recent Progress in Silica–Based Planar Light–wave Circuits on Silicon", IEE Proceedings: Optoelectronics, vol. 143, No. 5, Oct. 1, 1996, pp. 257–262, XP000680738.

* cited by examiner

Primary Examiner—Rodney Bovernick
Assistant Examiner—Omar Rojas
(74) Attorney, Agent, or Firm—Young & Thompson

(57) ABSTRACT

An optical device which has: a first optical waveguide disposed on a substrate having a thermo-optical effect; a second optical waveguide that, at its one end, has part which is disposed close to and in parallel with part of the first optical waveguide by a predetermined length on the substrate, and that, at the parallel part, is evanescent-coupled with light propagating through the first optical waveguide; light reflector that is disposed opposed to the end faces, at the one end, of the first and second optical waveguides and that totally reflects light emitted from the end faces; and distribution ratio altering system that heats around the evanescent-coupled parallel part of the first and second optical waveguides to alter a distribution ratio of lights emitted from the other ends of the first and second optical waveguides to which incident light supplied to the first optical waveguide at the other end is distributed.

12 Claims, 8 Drawing Sheets

THERMO-OPTIC DEVICE WITH EVANESCENT WAVE COUPLING

FIELD OF THE INVENTION

This invention relates to an optical device, and more particularly to, an optical device provided with a directional coupling type optical waveguide.

BACKGROUND OF THE INVENTION

In recent years, optical fiber communication systems capable of conducting the high-quality transmission of large-capacity information have come into practical use. As the component part of such a communication system, a directional coupling type optical device that can control optical signal at a high speed and uses optical waveguides capable of being miniaturized by integration has been developed.

FIG.1 shows the generalized composition of a conventional optical device thus developed. This optical device is composed of a first optical waveguide 11 and a second optical waveguide 12 on a $LiNbO_3$ substrate 10. The first optical waveguide 11 and the second optical waveguide 12 have the same width, thickness and refractive index, and are disposed in parallel close to each other, thereby forming a directional coupler 13 in this parallel part. The coupling length that the movement of light between optical waveguides in the directional coupler 13 becomes 100% is defined as a perfect coupling length Lc. The directional coupler 13 is formed with a coupling length that is half of the perfect coupling length Lc. Also, a total reflection film (or total reflection plate) 14 is disposed opposed to the end faces of the first and second optical waveguides forming the directional coupler 13. Further, on the first and second optical waveguides 11, 12 forming the directional coupler 13, control electrodes 15, 16 are formed through buffer layers (not shown), and voltage can be applied to its both ends.

When voltage is not applied to the control electrodes 15, 16, the optical energy of incident light 17 supplied to the first optical waveguide 11 of this optical device gradually moves to the second optical waveguide 12 in the directional coupler 13. Then, when propagating by half of the perfect coupling length Lc to reach the total reflection film 14, half of the energy of incident light is moved to the second optical waveguide 12. At this time, the first and second optical waveguides 11, 12 have a same optical intensity, and have phases inverse to each other. It reflects totally on the total reflection film 14, then propagating through the directional coupler 13 in the reverse direction. Also in this case, the optical energy gradually moves to the second optical waveguide 12. When returning to the incidence point of the directional coupler 13, all the optical energy is moved to the second optical waveguide 12. As a result, emitting light 18 with the same optical intensity as incident light 17 is obtained from the second optical waveguide 12.

However, this optical device is composed of the first and second optical waveguides 11, 12 on the $LiNbO_3$ substrate 10. The substrate 10 has an electro-optic effect, where the refractive index at the periphery of voltage-applied part varies by an electric field caused by the application of voltage. Thus, applying voltage to the control electrodes 15, 16, causes the refractive index of the first and second optical waveguides 11, 12 formed under the electrodes to be changed.

In this state, the coupling state between the optical waveguides changes due to the discordance of phase speed between the waveguide modes of the optical waveguides forming the directional coupler 13.

Thus, light 18 can be controlled so as not to be emitted from the second optical waveguide 12.

Namely, by applying voltage to the electrode on the optical waveguide forming the directional coupler provided on the substrate with the electro-optic effect, when supplying incident light from one optical waveguide, light can be controlled so as to be emitted from another optical waveguide or so as not to be emitted therefrom.

This means that the on/off control of emitted light can be performed.

Also, the optical device to perform such control can be miniaturized since it only has to have half of the perfect coupling length.

Such optical devices using the electro-optic effect are, for example, disclosed in Japanese patent application laid-open Nos. 63-234227(1988) and 3-256028(1991).

However, these optical devices have to use a very specific substrate with the electro-optic effect, e.g., $LiNbO_3$ substrate. Therefore, there is a problem that especially in combining and integrating various kinds of optical devices, the manufacturing cost increases.

SUMMARY OF THE INVENTION

Accordingly, it is an object of the invention to provide an optical device in which integration can be attained at a low manufacturing cost.

According to the invention, an optical device, comprises:

a first optical waveguide disposed on a substrate having a thermo-optical effect;

a second optical waveguide that, at its one end, has part which is disposed close to and in parallel with part of the first optical waveguide by a predetermined length on the substrate, and that, at the parallel part, is evanescent-coupled with light propagating through the first optical waveguide;

light reflecting means that is disposed opposed to the end faces, at the one end, of the first and second optical waveguides and that totally reflects light emitted from the end faces; and distribution ratio altering means that heats around the evanescent-coupled parallel part of the first and second optical waveguides to alter a distribution ratio of lights emitted from the other ends of the first and second optical waveguides to which incident light supplied to the first optical waveguide at the other end is distributed.

According to another aspect of the invention, an optical device, comprises:

a first optical waveguide disposed on a substrate having a thermo-optical effect;

a second optical waveguide that, at its one end, has part which is disposed close to and in parallel with part of the first optical waveguide by a predetermined length on the substrate, and that, at the parallel part, is evanescent-coupled with light propagating through the first optical waveguide;

light reflecting means that is disposed opposed to the end faces, at the one end, of the first and second optical waveguides and that totally reflects light emitted from the end faces;

emitted light detecting means that is disposed opposed to the end face of the second optical waveguide at the other end and that detects the intensity of light emitted from the end face of the second optical waveguide at the other end; and distribution ratio altering means that heats around the evanescent-coupled parallel part of the first and second optical waveguides to alter a distribution ratio of lights emitted from the other ends of the first and second optical waveguides to which incident light supplied to the first optical waveguide at the other end is distributed.

According to another aspect of the invention, an optical device, comprises:

a first optical waveguide disposed on a substrate having a thermo-optical effect;

a second optical waveguide that, at its one end, has part which is disposed close to and in parallel with part of the first optical waveguide by a predetermined length on the substrate, and that, at the parallel part, is evanescent-coupled with light propagating through the first optical waveguide;

light reflecting means that is disposed opposed to the end faces, at the one end, of the first and second optical waveguides and that transmits part of light emitted from the end faces and reflects the remaining part of light;

received light intensity detecting means that detects the intensity of light transmitted through the light reflecting means; and distribution ratio altering means that heats around the evanescent-coupled parallel part of the first and second optical waveguides to alter a distribution ratio of lights emitted from the other ends of the first and second optical waveguides to which incident light supplied to the first optical waveguide at the other end is distributed.

According to another aspect of the invention, an optical device, comprises:

a first optical waveguide disposed on a substrate having a thermo-optical effect;

a second optical waveguide that, at its one end, has part which is disposed close to and in parallel with part of the first optical waveguide by a predetermined length on the substrate, and that, at the parallel part, is evanescent-coupled with light propagating through the first optical waveguide;

light reflecting means that is disposed opposed to the end faces, at the one end, of the first and second optical waveguides and that transmits part of light emitted from the end faces and reflects the remaining part of light;

received light intensity detecting means that detects the intensity of light transmitted through the light reflecting means;

emitted light detecting means that is disposed opposed to the end face of the second optical waveguide at the other end and that detects the intensity of light emitted from the end face of the second optical waveguide at the other end; and distribution ratio altering means that heats around the evanescent-coupled parallel part of the first and second optical waveguides to alter a distribution ratio of lights emitted from the other ends of the first and second optical waveguides to which incident light supplied to the first optical waveguide at the other end is distributed.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments of the invention will be explained in detail below.

Figure 1:
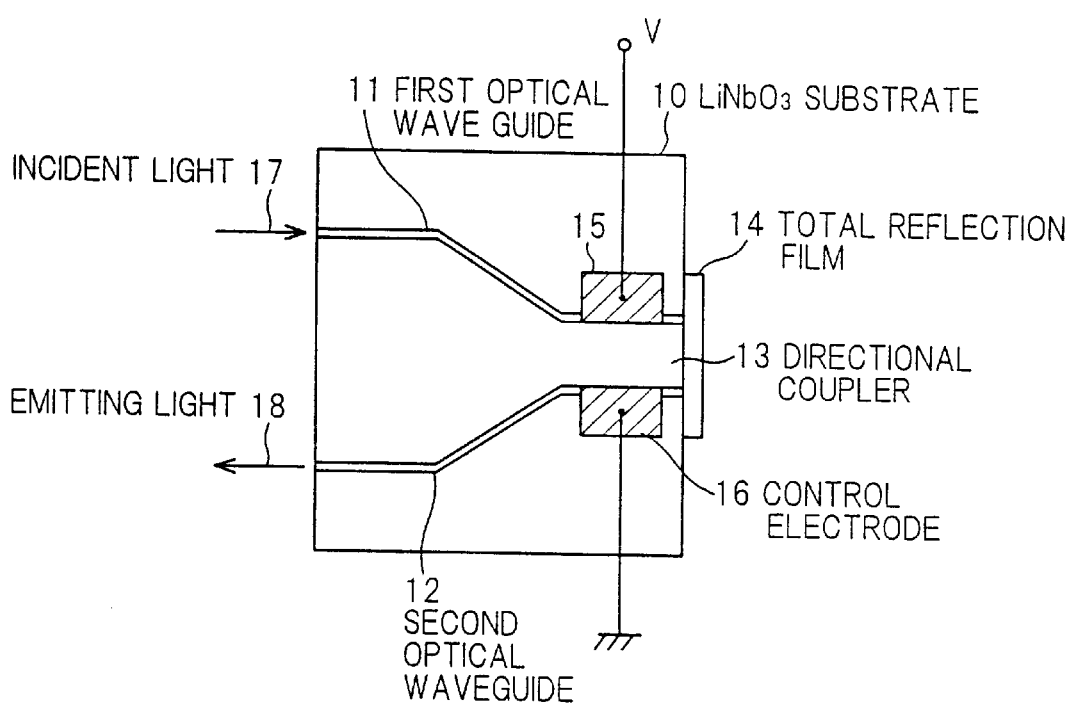
FIG. 1 is a plan view showing the generalized composition of the conventional optical device.
Figure 2:
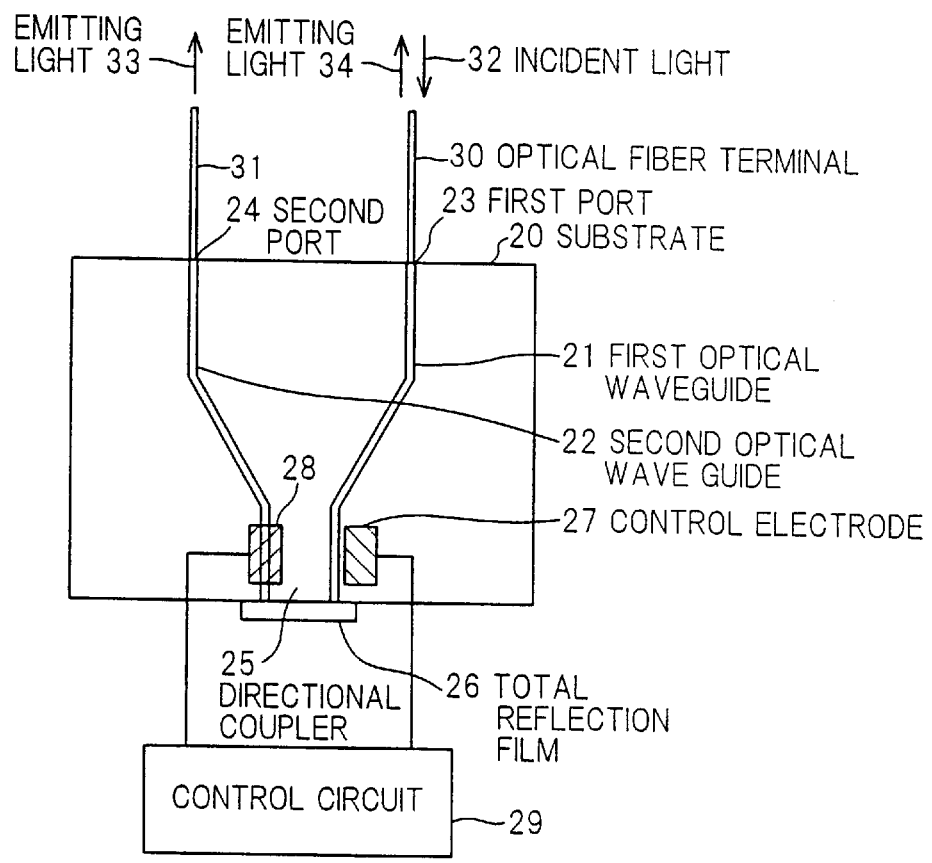
FIG. 2 is a plan view showing the generalized composition of an optical device in a first preferred embodiment according to the invention.

FIG. 2 shows the generalized composition of an optical device in the first preferred embodiment according to the invention. This optical device is composed of a first optical waveguide 21 and a second optical waveguide 22 formed on a substrate 20 that is of quartz glass as the base material. Light is supplied to or emitted from a first port 23 and a second port 24 provided at the end face of the substrate 20. The first and second optical waveguides 21, 22 have the same width, thickness and refractive index. Also, on the opposite side of the substrate 20 to the first and second ports 23, 24, the first and second optical waveguides 21, 22 are disposed in parallel close to each other, thereby forming a directional coupler 25 in this parallel part. The directional coupler 25 is formed with a coupling length that is half of the perfect coupling length Lc. The end of this coupling length contacts the end face of the substrate 20, and a total reflection film 26 is disposed opposed to the end faces of the optical waveguides.

Also, just over or around the first and second optical waveguides 21, 22 forming the directional coupler 25, control electrodes 27, 28 are formed, and electric power is supplied from a control circuit 29. At the first and second ports 23, 24, for example, optical fiber terminals 30, 31 are coupled abutting on the ports, optionally using micro-optics technology to couple through lens to the port, to give such an optical wiring that optical signal is coupled efficiently.

When the control circuit 29 does not apply voltage to the control electrodes 27, 28, incident light 32 supplied from the first port 23 is propagated through the first optical waveguide 21, evanescent-coupled with the second optical waveguide 22 by the directional coupler 25. Here, the coupling length of the directional coupler 25 is represented as L. When the coupling length L is equal to the perfect coupling length Lc, the optical energy propagating the first optical waveguide 21 gradually moves to the second optical waveguide 22, and all the energy is perfectly moved at the end surface of the substrate 20 to which the end of coupling length of the directional coupler 25 faces.

However, since in the first embodiment, the coupling length L of the directional coupler 25 formed on the substrate 20 of the optical device is formed half of the perfect coupling length Lc, at the end face of the substrate 20 to which the end of the coupling length of the directional coupler 25 faces, half of the optical energy propagating the first optical waveguide 21 is moved to the second optical waveguide. Further, since the total reflection film 26 is disposed opposed to the end surface of the substrate 20 to which the directional coupler 25 faces, the signal light propagating the first optical waveguide 21 is totally reflected, again returned through the first and second optical waveguides 21, 22 forming the directional coupler 25. Also, when returned through the directional coupler 25, the optical energy gradually moves to the second optical waveguide 22. Finally, all the optical energy is moved. In this case, emitting light 33 with a same optical intensity as incident light 32 is propagated through the second optical waveguide 22, emitted from the second port 24.

Namely, for incident light 32 from the first port 23, the coupling length of the directional coupler 25 becomes equal to the perfect coupling length Lc by the total reflection of the total reflection film 26, therefore the emitting light 33 is output from the second port 24.

Here, a distribution ratio n to show the relationship between the optical energy of incident light 32 supplied to the first port 23 then propagated through the first optical waveguide 21, the optical energy of emitting light 33 reflected at the end face of the directional coupler 25 then propagated through the second optical waveguide 22 and output from the second port 24 is defined by:

$\eta$=(optical energy of emitting light 33)/(sum of the optical energy of emitting light 33 and the optical energy of emitting light 34) . . . (1).

The condition that the distribution ratio $\eta$ becomes is that the coupling length L of the directional coupler 25 is equal to half of the perfect coupling length Lc. However, the perfect coupling length Lc is determined by various factors, one of which is the refractive indexes n of the first and second optical waveguides 21, 22 forming the directional coupler 25. It is known that the refractive index n of optical waveguide can be easily altered by external factors, e.g., a mechanical stress, heat and electric field applied to the waveguide substrate. So, by altering the external factors intentionally, the refractive index n can be altered to adjust the distribution ratio $\eta$.

Meanwhile, the optical device in FIG. 2 is composed of the optical waveguides formed on the substrate 20 that is of quartz glass as the base material. Since such a quartz waveguide has a "thermo-optical effect" that the refractive index can be altered by heating, it is most efficient to use a heating system as means for adjusting the refractive index n. So, through the control electrodes 27, 28 for heating that are formed just over or around the first and second optical waveguides forming the directional coupler 25, electric power can be supplied from the control circuit 29. By such a composition, only the circumference of the waveguides can be heated locally.

When a predetermined voltage is applied to the control electrodes 27, 28 by the control circuit 29, the refractive index n varies according to electric power supplied from the control electrodes 27, 28 for heating in the directional coupler 25, and as the result, the perfect coupling length Lc also varies. Thus, incident light 32 supplied to the first port 23 is propagated through the first optical waveguide 21, and the optical energy according to the varied perfect coupling length Lc moves to the second optical waveguide 22 side. Then, after being totally reflected by the total reflection film 26, it returns through the directional coupler 25 and emitting lights 34 and 33 are output from the first and second optical waveguides 21 and 22, respectively. Here, the sum of the optical energy of emitting light 33 and the optical energy of emitting light 34 is equal to the optical energy of incident light 32. However, by altering electric power supplied from the control electrodes 27, 28 for heating, the output distributions of emitting lights 33, 34 can be altered arbitrarily, and therefore the distribution ratio $\eta$ can be adjusted.

Figure 3:
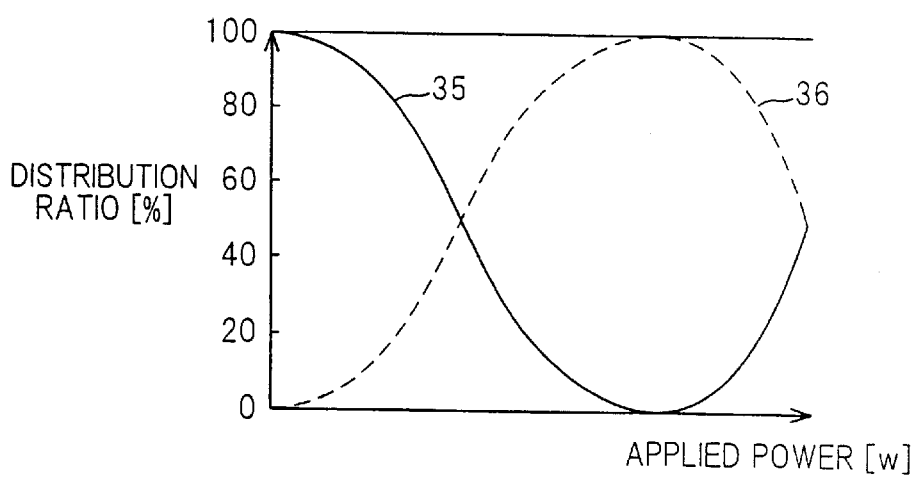
FIG. 3 is a graph showing the relationship between supplied electric power and distribution ratio in the first embodiment.

FIG. 3 shows the relationship between electric power supplied from the control electrodes 27, 28 required for heating to generate the thermo-optical effect of the optical device in FIG. 2 and the distribution ratio $\eta$. The lateral axis indicates applied electric power [W] and the vertical axis indicates the distribution ratio $\eta$ [%]. Also, a waveform 35 represents the distribution ratio $\eta$ to emitting light 33 shown in expression (1), and a waveform 36 represents the distribution ratio $\eta'$ to emitting light 34. Namely, the distribution ratio $\eta'$ is given by dividing the optical energy of emitting light 34 by the sum of the optical energy of emitting light 33 and the optical energy of emitting light 34.

When no voltage is applied to the control electrodes 27, 28, electric power is not supplied. Therefore, when incident light 32 supplied to the first port 23 is reflected by the total reflection film 26 then returned through the directional coupler 25 with the coupling length that is set half of the perfect coupling length Lc, all the optical energy is moved to the second optical waveguide 22.

Namely, the distribution ratio $\eta$ to emitting light 33 is 100%, and the distribution ratio $\eta'$ to emitting light 34 is 0%. However, as electric power supplied gradually increases with applied voltage, the energy movement to the second optical waveguide 22 reduces gradually. Finally, all the optical energy is propagated through the first optical waveguide 21 and output as emitting light 34 (the distribution ratio $\eta'$ becomes 100%). At this time, the distribution ratio $\eta$ to emitting light 33 is 0% since the sum of the optical energies of emitting lights 33, 34 is constant.

Thus, in the optical device in the first embodiment, the optical waveguides are formed on the substrate of quartz glass as the base material. There are provided the directional coupler 25 with the evanescent-coupled coupling length L that is half of the perfect coupling length Lc, where the end of the coupling length faces to the end face of the substrate 20, and the total reflection film 26 disposed opposed to the end face of the waveguide. Also, there are provided the control electrodes 27, 28 just over or around the first and second optical waveguides 21, 22 forming the directional coupler 25. Heating it locally, the refractive index n of the optical waveguide of the directional coupler 25 is altered. Thereby, the perfect coupling length Lc can be altered and therefore the energy distribution of lights emitted from the directional coupler 25 can be altered. Also, since inexpensive quartz glass is used as the base material of the substrate, the integration can be realized at a lower manufacturing cost than conventional one. Further, by using part of the directional coupler repeatedly, the optical device can be miniaturized and electric power required to generate the thermo-optical effect can be halved.

Figure 4:
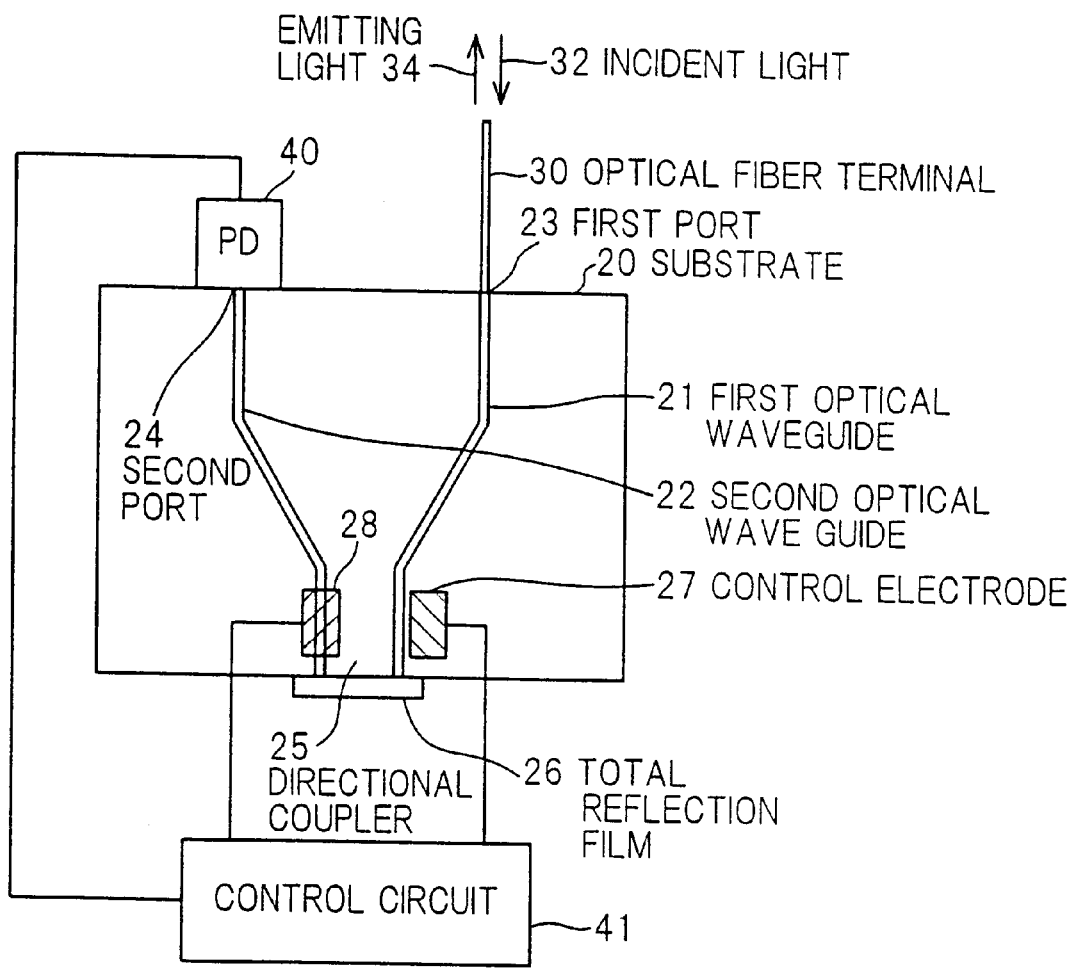
FIG. 4 is a plan view showing the generalized composition of an optical device in a second preferred embodiment according to the invention.

FIG. 4 shows the generalized composition of an optical device in the second preferred embodiment according to the invention. In FIG. 4, like parts are indicated by like reference numerals as used in FIG. 2 and their explanations are omitted here. The optical device in the second embodiment is composed so that emitting light 33 output from the second port 24 of the optical device in the first embodiment in FIG. 2 can be monitored and electric power supplied can be altered by applying the control electrodes 27, 28 according to the monitored result.

Namely, the first and second optical waveguides 21, 22 are formed on the substrate 20 that is of quartz glass as the base material. Light is supplied to or emitted from the first port 23 and the second port 24 provided at the end face of the substrate 20. The first and second optical waveguides 21, 22 have same width, thickness and refractive index. Also, on the opposite side of the substrate 20 to the first and second ports 23, 24, the first and second optical waveguides 21, 22 are disposed in parallel close to each other, thereby forming the directional coupler 25 in this parallel part.

The directional coupler 25 is formed with a coupling length that is half of the perfect coupling length Lc. The end of this coupling length contacts the end face of the substrate 20, and the total reflection film 26 is disposed opposed to the end faces of the optical waveguides.

Also, just over or around the first and second optical waveguides 21, 22 forming the directional coupler 25, control electrodes 27, 28 are formed, and electric power is supplied from a control circuit 41. At the first port 23, for example, the optical fiber terminal 30 is coupled abutting on the port, optionally using micro-optics technology to couple through lens to the port, to give such an optical wiring that optical signal is coupled efficiently.

Further, at the second port 24, a photo diode (hereinafter referred to as 'PD') 40 is disposed directly. The monitoring results of PD 40 are input to the control circuit 41.

For this optical device, the energy movement between the optical waveguides evanescent-coupled according to electric power supplied from the control circuit 41 is performed similarly to that in the first embodiment. Therefore, the explanations are omitted here.

In the second embodiment, emitting light output from the second port 24 is input to PD 40, and therefore the optical energy of light emitted as emitting light 33 can be detected as the received light energy of PD 40. Thus, by feedbacking the received light results to the control circuit 41 and altering electric power supplied from the control circuit 41 to the control electrodes 27, 28, the intensity of light 34 emitted from the first port 23 can be adjusted to a desired value. Alternatively, since the sum of the energy of emitting light 34 emitted from the first port 23 and the energy of received light by PD 40 at the second port 24 is constant, the intensity of signal light received by PD 40 can be adjusted.

Thus, in the second embodiment, at the second port 24, PD 40 is disposed directly. Light emitted propagating through the second optical waveguide 22 is monitored by PD 40. By feedbacking the monitoring results and altering electric power supplied from the control electrodes 27, 28 by the control circuit 41, the intensity of light emitted from the first optical waveguide 21 or the second optical waveguide 22 can be adjusted to a desired value.

For example, such an optical device can be used for the level adjustment of signal light in an optical fiber transmission system.

Figure 5:
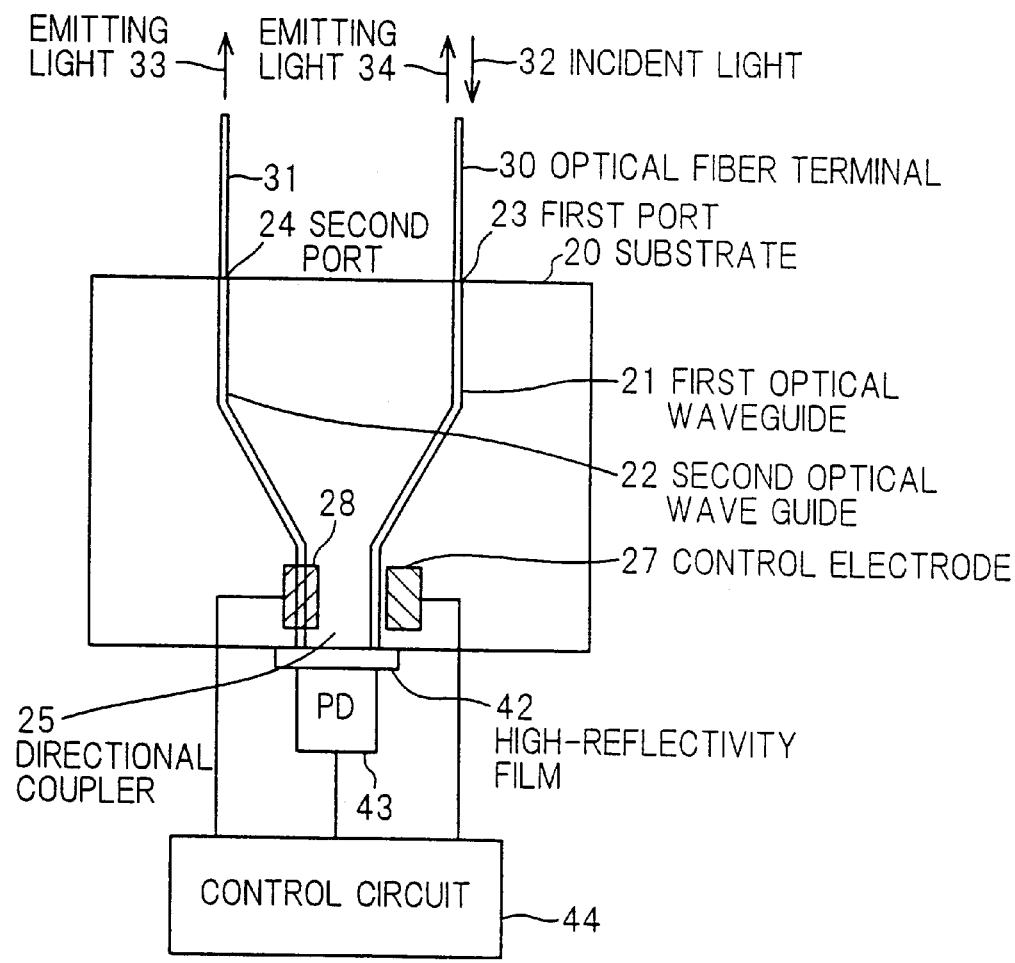
FIG. 5 is a plan view showing the generalized composition of an optical device in a third preferred embodiment according to the invention.

FIG. 5 shows the generalized composition of an optical device in the third preferred embodiment according to the invention. In FIG. 5, like parts are indicated by like reference numerals as used in FIG. 2 and their explanations are omitted here. The optical device in the third embodiment is provided with high-reflectivity film (or high-reflectivity plate) 42, which is not total reflection film, that is disposed opposed to the end face of the optical waveguide of the substrate 20 where the coupling length of the directional coupler 25 contacts. The high-reflectivity film 42 transmits part of signal light propagating through the directional coupler 25 by the coupling length L to reach the end face of the optical waveguide of the substrate 20, and reflects the rest. The level of signal light transmitted through the high-reflectivity film 42 is detected by PD 43, and then feed-backed as the monitoring result to the control circuit 44.

Namely, the first and second optical waveguides 21, 22 are formed on the substrate 20 that is of quartz glass as the base material. Light is supplied to or emitted from the first port 23 and the second port 24 provided at the end face of the substrate 20. The first and second optical waveguides 21, 22 have same width, thickness and refractive index. Also, on the opposite side of the substrate 20 to the first and second ports 23, 24, the first and second optical waveguides 21, 22 are disposed in parallel close to each other, thereby forming the directional coupler 25 in this parallel part.

The directional coupler 25 is formed with a coupling length that is half of the perfect coupling length Lc. The end of this coupling length contacts the end face of the substrate 20, and the high-reflectivity film 42 is disposed opposed to the end faces of the optical waveguides. Signal light transmitted through the high-reflectivity film 42 is input to PD 43.

Also, just over or around the first and second optical waveguides 21, 22 forming the directional coupler 25, control electrodes 27, 28 are formed, and electric power is supplied from a control circuit 44 according to the received light result of PD 43 to receive signal light transmitting through the high-reflectivity film 42.

At the first and second ports 23, 24, for example, the optical fiber terminals 30, 31 are coupled abutting on the ports, optionally using micro-optics technology to couple through lens to the port, to give such an optical wiring that optical signal is coupled efficiently.

For this optical device, the energy movement between the optical waveguides evanescent-coupled according to electric power supplied from the control circuit 44 is performed similarly to that in the first embodiment. Therefore, the explanations are omitted here.

In the third embodiment, the high-reflectivity film 42 transmits part of signal light propagating through the directional coupler 25 and the optical intensity of transmitted light is then detected by PD 43. Therefore, electric power supplied from the control circuit 44 to the control electrodes 27, 28 can be altered according to the monitoring result of optical intensity detected by PD 43. Also, it can be detected whether incident light 32 supplied to the first port 23 is in the off-state or not. Moreover, the intensity of emitting light 33, 34 emitted from the first or second port 23, 24 can be adjusted nearly to a desired value.

Thus, in the third embodiment, the high-reflectivity film 42 is disposed opposed to the end face of the optical waveguide of the substrate 20 where the end of the coupling length of the directional coupler 25 contacts. Light transmitted through the high-reflectivity film 42 is monitored, which allows the control circuit 44 to be controlled. Thereby, it can be detected whether incident light 32 supplied to the first port 23 is in the off-state or not.

Even when the level of incident light 32 is abruptly varied in controlling constantly either of emitting lights 33, 34, the intensity of either of emitting lights 33, 34 can be adjusted nearly to a desired value.

For example, such an optical device can be used for the monitoring of signal light in an optical fiber transmission system.

Figure 6:
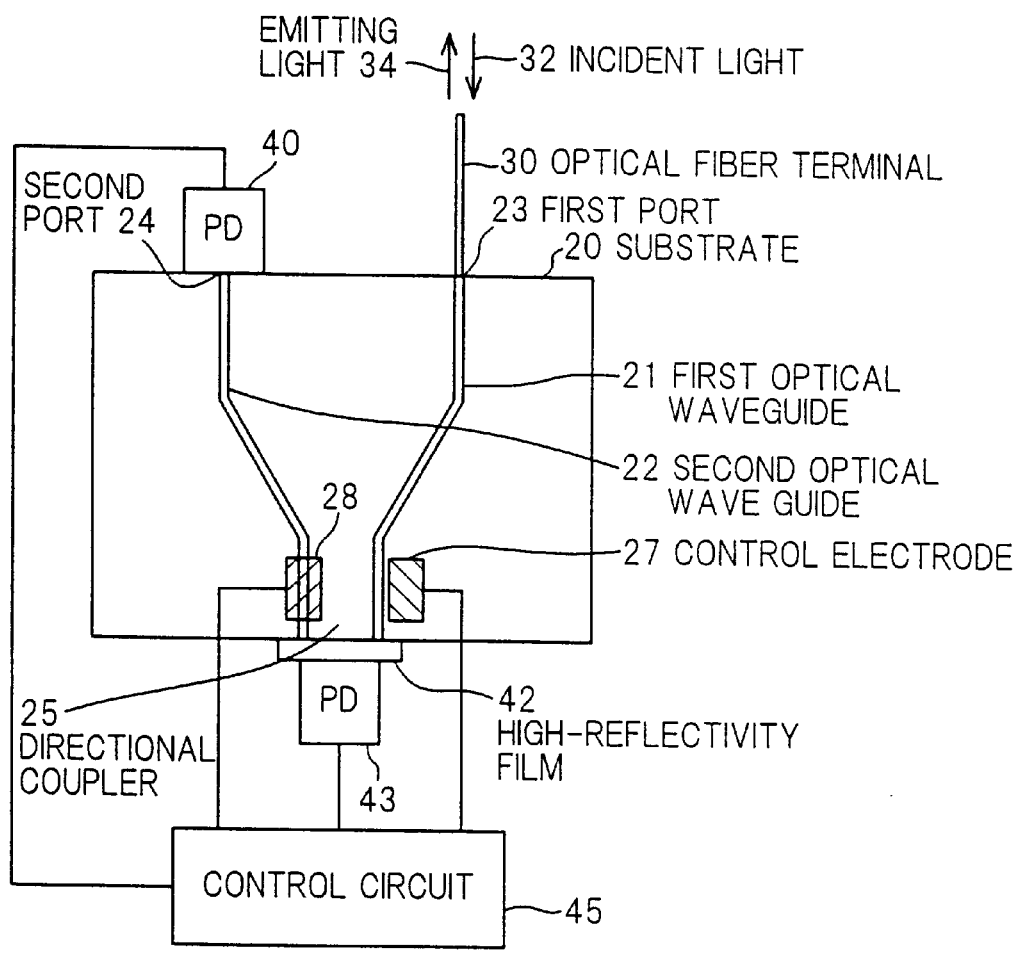
FIG. 6 is a plan view showing the generalized composition of an optical device in a fourth preferred embodiment according to the invention.

FIG. 6 shows the generalized composition of an optical device in the fourth preferred embodiment according to the invention. In FIG. 6, like parts are indicated by like reference numerals as used in FIGS.2, 4 and 5 and their explanations are omitted here. The optical device in the fourth embodiment monitors light 33 emitted from the second port 24. Further, it is provided with high-reflectivity film 42, which is not total reflection film, that is disposed opposed to the end face of the optical waveguide of the substrate 20 where the coupling length of the directional coupler 25 contacts. Light transmitting through the high-reflectivity film 42 is also monitored. According to the monitoring results of emitting light 33 and transmitted light of the high-reflectivity film 42, electric power supplied from a control circuit 45 to the control electrodes 27, 28 can be altered.

Namely, the first and second optical waveguides 21, 22 are formed on the substrate 20 that is of quartz glass as the base material.

Light is supplied to or emitted from the first port 23 and the second port 24 provided at the end face of the substrate 20. The first and second optical waveguides 21, 22 have same width, thickness and refractive index. Also, on the opposite side of the substrate 20 to the first and second ports 23, 24, the first and second optical waveguides 21, 22 are disposed in parallel close to each other, thereby forming the directional coupler 25 in this parallel part. The directional coupler 25 is formed with a coupling length that is half of the perfect coupling length Lc. The end of this coupling length contacts the end face of the substrate 20, and the high-reflectivity film 42 is disposed opposed to the end faces of the optical waveguides. Signal light transmitted through the high-reflectivity film 42 is input to PD 43.

Also, just over or around the first and second optical waveguides 21, 22 forming the directional coupler 25, control electrodes 27, 28 are formed, and electric power is supplied from a control circuit 45.

At the first port 23, for example, the optical fiber terminal 30 is coupled abutting on the port, optionally using micro-optics technology to couple through lens to the port, to give such an optical wiring that optical signal is coupled efficiently.

Also, at the second port 24, PD 40 is disposed directly. The monitoring result of PD 40 is input to the control circuit 45. The control circuit 45 supplies electric power according to the received light result of PD 43 to receive signal light transmitting through the high-reflectivity film 42 and the received light result of PD 40 disposed directly at the second port 24.

For this optical device, the energy movement between the optical waveguides evanescent-coupled according to electric power supplied from the control circuit 45 is performed similarly to that in the first embodiment. Therefore, the explanations are omitted here.

In the fourth embodiment, the high-reflectivity film 42 transmits part of signal light propagating through the directional coupler 25 and the optical intensity of transmitted light is then detected by PD 43. Also, the optical intensity of light emitted from the second port 24 is detected by PD 40.

Therefore, electric power supplied from the control circuit 45 to the control electrodes 27, 28 can be altered according to the monitoring result of optical intensity detected by PD 43. Thereby, it can be detected that incident light 32 supplied to the first port 23 is in the off-state.

Further, even when the level of incident light 32 is varied abruptly, emitting light with a desired intensity to be controlled constant in advance can be output. Also, by altering electric power supplied from the control circuit 45 to the control electrodes 27, 28 according to the monitoring result of optical intensity detected by PD 40, the intensity of emitting light 33 emitted from the first optical waveguide 21 can be adjusted precisely to a desired value.

Thus, in the fourth embodiment, the high-reflectivity film 42 is disposed opposed to the end face of the optical waveguide of the substrate 20 where the end of the coupling length of the directional coupler 25 contacts. Light transmitted through the high-reflectivity film 42 is monitored, which allows the control circuit 45 to be controlled. Also, light emitted propagating through the second optical waveguide 22 is monitored by PD 40 disposed directly at the second port 24, and the monitoring result is feedbacked to control the control circuit 45. Thereby, even when the level of incident light 32 is abruptly varied in controlling constantly emitting light 33, a desired optical intensity of light can be output.

Also, according to the monitoring result of PD 40, emitting light 33 can be output with precise signal intensity.

Figure 7:
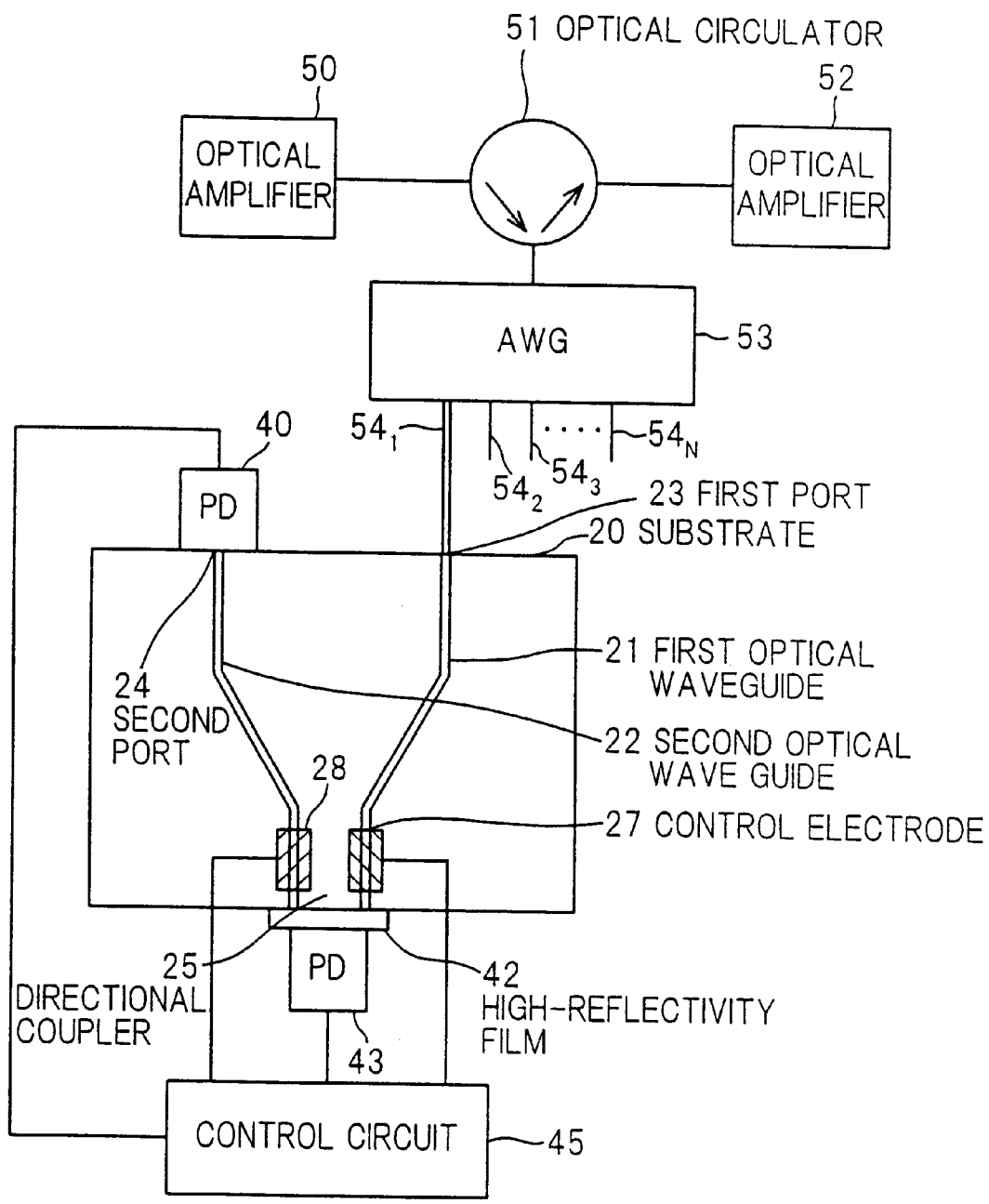
FIG. 7 is a plan view showing the generalized composition of an optical device in a fifth preferred embodiment according to the invention.

FIG. 7 shows the generalized composition of an optical device in the fifth preferred embodiment according to the invention. In FIG. 7, like parts are indicated by like reference numerals as used in FIG. 6 (fourth embodiment) and their explanations are omitted here.

The optical device in the fifth embodiment is provided with an optical amplifier 50 to amplify the optical intensity at a predetermined amplification, an optical circulator 51 to which light amplified by the optical amplifier 50 is input, and an optical amplifier 52 to which light output from the optical circulator 51 is input. Further, the optical circulator 51 is connected to an arrayed waveguide grating (hereinafter referred to as 'AWG') 53. AWG 53 can output demultiplexing light input from the optical circulator 51 into N optical fibers $54_1$ to $54_N$ for wavelength components, and can multiplex the respective optical signals input from the N optical fibers $54_1$ to $54_N$, outputting it to the optical circulator 51. The optical fibers $54_1$ to $54_N$ are connected with the first port 23 of the optical device in the fourth embodiment in FIG. 6. This optical device is controlled so that, as described in the fourth embodiment, it can output light with a predetermined optical intensity even when incident light is varied abruptly.

Amplified light from the optical amplifier 50 is input to the optical circulator 51. The optical circulator 51 outputs light input from the optical amplifier 50 to AWG 53. In AWG 53, the respective wavelength components are input through the optical fibers $54_1$ to $54_N$ to the optical device. Since this optical device can control incident light to be output again with a predetermined optical intensity, light with the optical intensity adjusted as described above is output to AWG 53. In AWG 53, optical signals with wavelength components thus adjusted to a desired signal intensity and returned again are multiplexed, and then are output to the optical circulator 51. The optical circulator 51 outputs light input from AWG 53 to the optical amplifier 52.

Thus, for example, a repeater in optical fiber transmission system can repeat amplifying optical signal, but the signal levels of all wavelength components cannot be always kept constant by the optical intensity of optical amplifier since some optical elements have a wavelength-dependent characteristic. Especially in wavelength division multiplexing system, when wavelength components are transmitted multiplexed, the wavelength-dependent characteristic of optical element causes a deterioration in reliability. So, as described above, between the optical amplifiers, the wavelength components are demultiplexed, each component being adjusted to have a desired signal intensity, then multiplexed again.

Thereby, each of the wavelength components can have a predetermined optical intensity and therefore a high-quality transmission system can be obtained. Also, in conventional devices, part for an optical divider, an adjustable optical attenuator or a total reflector requires a very-large mounting area since it is necessary for each wavelength component. In this embodiment, so miniaturized devices can be provided. Further, comparing with the conventional adjustable optical attenuator, the consumption power can be halved.

Modifications to the above-described embodiments are explained below.

Figure 8:
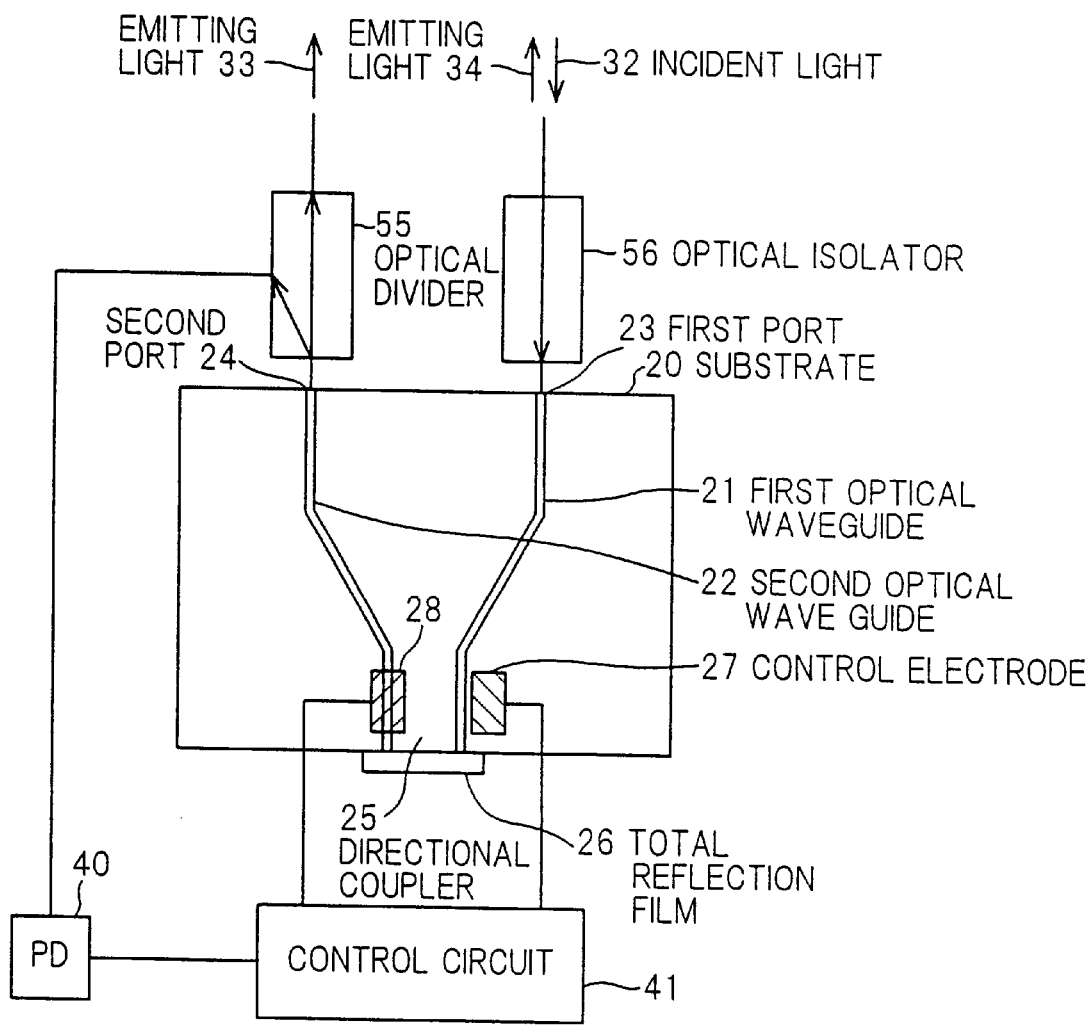
FIG. 8 is a plan view showing the generalized composition of an optical device in a first modification according to the invention.

FIG. 8 shows the generalized composition of an optical device in the first modification. In FIG. 8, like parts are indicated by like reference numerals as used in FIG. 4 (second embodiment) and their explanations are omitted here.

To the first port 23 of this optical device, incident light 32 is supplied through an optical isolator 56. Also, emitting light from the second port 24 is divided by an optical divider 55, one is output as emitting light 33 and the other is input to PD 40, enabling the control circuit 41 to be controlled.

Thus, the optical isolator and optical divider that prevent light from reflecting into waveguide can be used. Thereby, the precision in controlling optical intensity can be enhanced.

Figure 9:
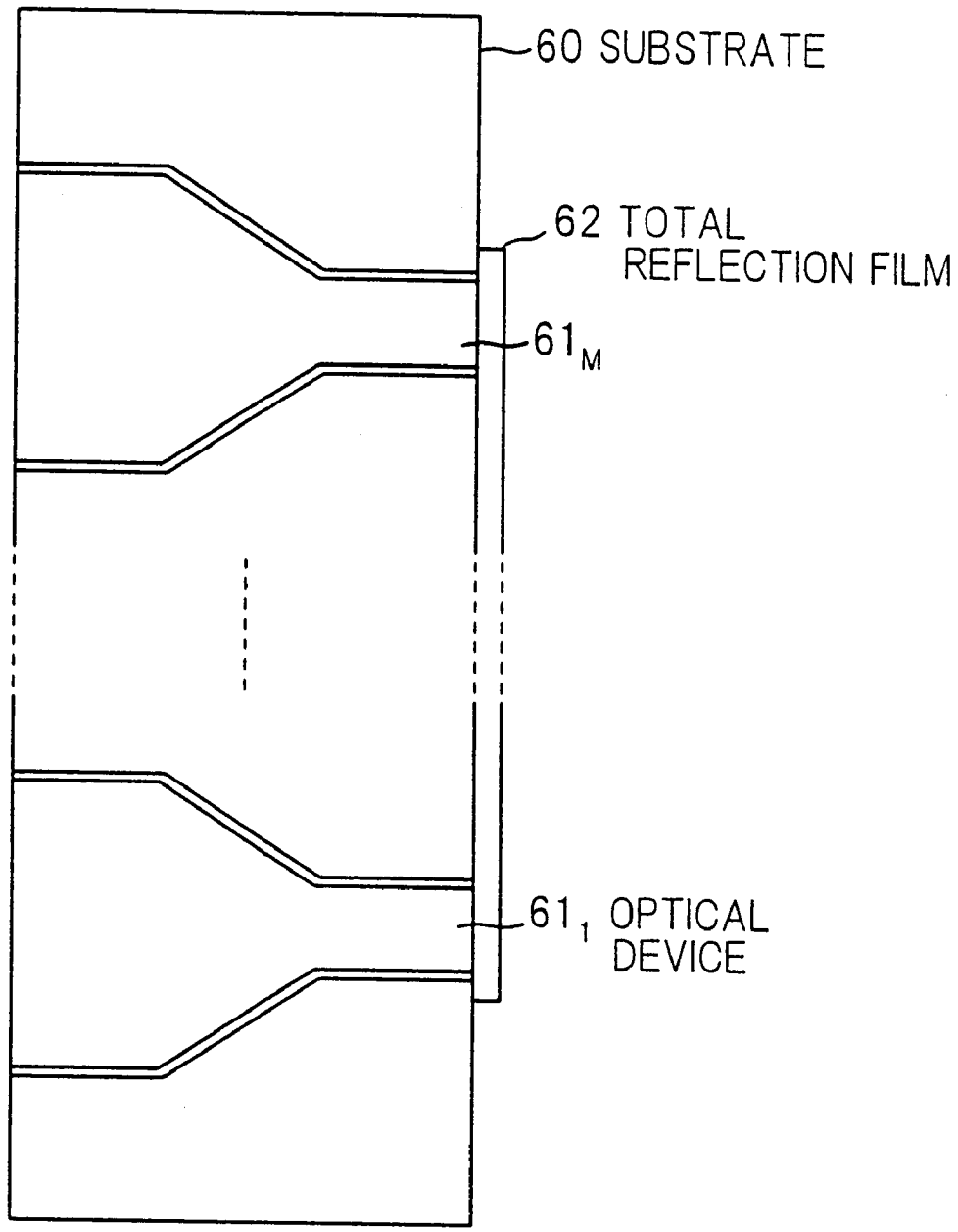
FIG. 9 is a plan view showing the generalized composition of an optical device in a second modification according to the invention.

FIG. 9 shows the generalized composition of an arrayed optical device. As shown, on a substrate 60 that is of quartz glass as the base material, same optical devices $6_1$ to $61_M$ are arrayed. Total reflection film 62 is disposed opposed to the end face where the coupling length of directional couplers contacts. Thereby, it is so miniaturized. Also, high-reflectivity film other than the total reflection film can be disposed, where transmitted lights can be detected for controlling. Further, the total reflection film and high-reflectivity film may be arrayed in mixture. Also, the optical devices in the first to fifth embodiments described above can be arrayed as optical devices $6_1$ to $61_M$, and the total reflection film and/or high-reflectivity film may be disposed opposed to the end face where the coupling length of directional couplers contacts. By integrating thus arrayed devices, it is so miniaturized. Also, like the fifth embodiment, arraying similarly composed devices for wavelength components allows the device to be further miniaturized.

The optical devices described above can be used to control signal light to a constant level while being disposed on an optical transmission line, or can be applied to part of WAG, adjustable optical attenuator or reflector.

The inventor attains the miniaturization that the mounting area is reduced to one tenth of conventional one by disposing the optical device(s) on one waveguide substrate. Also, since the coupling length of directional coupler is made half of the perfect coupling length, the heat release value is halved, thereby a device such a cooling plate can be miniaturized. Further, due to the miniaturization of device and the reduction in manufacturing cost because of arraying, the cost is lowered to about one third, comparing with when assembling conventionally the respective components.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical device, comprising:

a first optical waveguide disposed on a substrate having a thermo-optical effect;

a second optical waveguide that, at its one end, has part which is disposed close to and in parallel with part of said first optical waveguide by a predetermined length on said substrate, and that, at the parallel part, is evanescent-coupled with light propagating through said first optical waveguide;

light reflecting means that is disposed to the end faces, at said one end, of said first and second optical waveguides and that totally reflects light emitted from said end faces; and distribution ratio altering means that heats around the evanescent-coupled parallel part of said first and second optical waveguides to alter a distribution ratio of lights emitted from the other ends of said first and second optical waveguides to which incident light supplied to said first optical waveguide at said other end is distributed, wherein said first and second optical waveguides have said parallel part at said one end with a length that is half of a perfect coupling length and are disposed on said substrate so that the end of said parallel part is aligned to the end face of said substrate.

2. An optical device, comprising:

a first optical waveguide disposed on a substrate having a thermo-optical effect;

a second optical waveguide that, at its one end, has part which is disposed close to and in parallel with part of said first optical waveguide by a predetermined length on said substrate, and that, at the parallel part, is evanescent-coupled with light propagating through said first optical waveguide;

light reflecting means that is disposed to the end faces, at said one end, of said first and second optical waveguides and that totally reflects light emitted from said end faces;

emitted light detecting means that is disposed opposed to the end face of said second optical waveguide at said other end and that detects the intensity of light emitted from the end face of said second optical waveguide at said other end; and distribution ratio altering means that heats around the evanescent-coupled parallel part of said first and second optical waveguides to alter a distribution ratio of lights emitted from the other ends of said first and second optical waveguides to which incident light supplied to said first optical waveguide at said other end is distributed, wherein said first and second optical waveguides have said parallel part at said one end with a length that is half of a perfect coupling length and are disposed on said substrate so that the end of said parallel part is aligned to the end face of said substrate.

3. An optical device, comprising:

a first optical waveguide disposed on a substrate having a thermo-optical effect;

a second optical waveguide that, at its one end, has part which is disposed close to and in parallel with part of said first optical waveguide by a predetermined length on said substrate, and that, at the parallel part, is evanescent-coupled with light propagating through said first optical waveguide;

light reflecting means that is disposed opposed to the end faces, at said one end, of said first and second optical waveguides and that transmits part of light emitted from said end faces and reflects the remaining part of light;

received light intensity detecting means that detects the intensity of light transmitted through said light reflecting means; and distribution ratio altering means that heats around the evanescent-coupled parallel part of said first and second optical waveguides to alter a distribution ratio of lights emitted from the other ends of said first and second optical waveguides to which incident light supplied to said first optical waveguide at said other end is distributed, wherein said first and second optical waveguides have said parallel part at said one end with a length that is half of a perfect coupling length and are disposed on said substrate so that the end of said parallel part is aligned to the end face of said substrate.

4. An optical device, comprising:

a first optical waveguide disposed on a substrate having a thermo-optical effect;

a second optical waveguide that, at its one end, has part which is disposed close to and in parallel with part of said first optical waveguide by a predetermined length on said substrate, and that, at the parallel part, is evanscent-coupled with light propagating through said first optical waveguide;

light reflecting means that is disposed opposed to the end faces, at said one end, of said first and second optical waveguides and that transmits part of light emitted from said end faces and reflects the remaining part of light;

received light intensity detecting means that detects the intensity of light transmitted through said light reflecting means;

emitted light detecting means that is disposed opposed to the end face of said second optical waveguide at said other end and that detects the intensity of light emitted from the end face of said second optical waveguide at said other end; and distribution ratio altering means that heats around the evanescent-coupled parallel part of said first and second optical waveguides to alter a distribution ratio of lights emitted from the other ends of said first and second optical waveguides to which incident light supplied to said first optical waveguide at said other end is distributed, wherein said first and second optical waveguides have said parallel part at said one end with a length that is half of a perfect coupling length and are disposed on said substrate so that the end of said parallel part is aligned to the end face of said substrate.

5. An optical device, according to claim 1, wherein:

multiple sets of said first optical waveguide, said second optical waveguide and said light reflecting means are disposed in the form of an array on said substrate.

6. An optical device, according to claim 2, wherein:

multiple sets of said first optical waveguide, said second optical waveguide and said light reflecting means are disposed in the form of an array on said substrate.

7. An optical device, according to claim 3, wherein:

multiple sets of said first optical waveguide, said second optical waveguide and said light reflecting means are disposed in the form of an array on said substrate.

8. An optical device, according to claim 4, wherein:

multiple sets of said first optical waveguide, said second optical waveguide and said light reflecting means are disposed in the form of an array on said substrate.

9. An optical device according to claim 1, wherein said substrate is quartz glass.

10. An optical device according to claim 2, wherein said substrate is quartz glass.

11. An optical device according to claim 3, wherein said substrate is quartz glass.

12. An optical device according to claim 4, wherein said substrate is quartz glass.

* * * * *